United States Patent
Kohinata et al.

(10) Patent No.: US 6,770,167 B2
(45) Date of Patent: Aug. 3, 2004

(54) PRODUCTION METHOD OF AND PRODUCTION APPARATUS FOR OPTICAL RECORDING DISC

(75) Inventors: Kokichi Kohinata, Kanagawa (JP); Shoji Akiyama, Saitama (JP); Yoshinori Itaba, Saitama (JP)

(73) Assignee: Sony Corporation, Tokyo (JP)

( * ) Notice: Subject to any disclaimer, the term of this patent is extended or adjusted under 35 U.S.C. 154(b) by 234 days.

(21) Appl. No.: 10/108,964

(22) Filed: Mar. 28, 2002

(65) Prior Publication Data

US 2002/0100559 A1 Aug. 1, 2002

Related U.S. Application Data

(62) Division of application No. 09/705,245, filed on Nov. 2, 2000.

(30) Foreign Application Priority Data

Nov. 2, 1999 (JP) .......................................... P11-312720

(51) Int. Cl.[7] .............................. B32B 31/12; G11B 7/26
(52) U.S. Cl. .................... 156/379.8; 156/538; 156/539; 156/556; 156/578
(58) Field of Search ........................... 156/379.6, 379.8, 156/538, 539, 556, 578, 272.2, 272.8, 275.5, 275.7, 295

(56) References Cited

U.S. PATENT DOCUMENTS 5,956,317 A    9/1999   Komiyama et al. .......... 369/286
5,961,777 A  * 10/1999  Kakinuma ................ 156/380.9

FOREIGN PATENT DOCUMENTS

JP          10312587     * 11/1998

* cited by examiner

*Primary Examiner*—Jeff H. Aftergut
*Assistant Examiner*—Justin R Fischer
(74) *Attorney, Agent, or Firm*—Sonnenschein, Nath & Rosenthal LLP

(57) ABSTRACT

A production method of and a production apparatus for an optical recording disc comprising two bonded round substrates, capable of obtaining a high quality optical recording disc by drastically reducing the number of bubbles remaining in a cured ultraviolet ray curing type resin of the completed optical recording disc.

An adhesive is applied on a predetermined position of the upper surface of a first round substrate. The first round substrate applied with the adhesive is reversed. The reversed first round substrate and a second round substrate are bonded with each other via the adhesive on the first round substrate.

6 Claims, 4 Drawing Sheets

US 6,770,167 B2

PRODUCTION METHOD OF AND PRODUCTION APPARATUS FOR OPTICAL RECORDING DISC

RELATED APPLICATION DATA

The present invention claims priority to Japanese Application No. P11-312720, filed Nov. 2, 1999, and is a divisional of U.S. application Ser. No. 09/705,245, filed Nov. 2, 2000, both of which are incorporated herein by reference to the extent permitted by law.

BACKGROUND OF THE INVENTION

1. Field of the Invention

The present invention relates to a production method of and a production apparatus for an optical recording disc comprising two round substrates bonded with each other.

2. Description of the Related Art

With reference to FIGS. 1A to 1E, a conventional production method of an optical recording disc will be explained. As shown in FIG. 1A, a second round substrate having 120 mm in diameter (made from, for example, polycarbonate) D2 is prepared. h2 is the center hole of the second round substrate D2. r2 is the recording surface of the second round substrate D2, with a data recording trace (comprising pit rows with different lengths and widths) formed concentrically or along a track tantamount to a circle.

As shown in FIG. 1B, while rotating the second round recording plate D2, an ultraviolet ray curing type resin R as an adhesive is dropped onto the recording surface r2 at an appropriate position in the range of 15 mm to 50 mm in radius on the recording surface r2 of the second round recording plate D2 so as to apply the ultraviolet ray curing type resin R in a ring-shape with a predetermined width substantially concentric with the second round substrate D2.

As shown in FIG. 1C, a first round substrate having a 120 mm diameter (made from, for example, polycarbonate) D1 is prepared. h1 is the center hole of the first round substrate D1. r1 is the recording surface of the first round substrate D1, with a data recording trace (comprising pit rows with different lengths and widths) formed concentrically or along a track close to a circle.

As shown in FIG. 1D, the recording surfaces r1, r2 of the first and second substrates D1, D2 are superimposed via the ultraviolet ray curing type resin R for uncured bonding so as to obtain an optical recording disc. The optical recording disc obtained by the uncured bonding is rotated at a high speed so as to spread the ultraviolet ray curing type resin R between the first and second round substrates D1, D2 to the whole portion of the inner peripheral part and the outer peripheral part by a centrifugal force so as to have an even thickness to thereby obtain an uncured bonded optical recording disc D.

As shown in FIG. 1E, by irirradiating an ultraviolet ray to the optical recording disc D comprising the first and second round substrates D1, D2 obtained by the uncured bonding via the ultraviolet ray curing type resin R spread in FIG. 1D for curing the ultraviolet ray curing type resin R, the first and second round substrates D1, D2 are bonded so as to provide a completed optical recording disc D.

According to the conventional production method of an optical recording disc, since the ultraviolet ray curing type resin R dropped on the second round substrate D2 is spread so that the contact starting area of the ultraviolet ray curing type resin R with respect to the first round substrate D1 is wide, a great problem arises in that large numbers of bubbles generate in the ultraviolet ray curing type resin R so that the large numbers of the bubbles remain in the cured ultraviolet ray curing type resin R of a completed optical recording disc to thereby deteriorate the quality of the optical recording disc.

SUMMARY OF THE INVENTION

The present invention is to provide a production method of and a production apparatus for an optical recording disc comprising two bonded round substrates, capable of obtaining a high quality optical recording disc by drastically reducing the number of bubbles remaining in an adhesive of the completed optical recording disc.

Moreover, the present invention is to provide a production method of and a production apparatus for an optical recording disc comprising two bonded round substrates, capable of obtaining a high quality optical recording disc by drastically reducing the number of bubbles remaining in a cured ultraviolet ray curing type resin of the completed optical recording disc.

A first aspect of the present invention is a production method of an optical recording disc comprising the steps of applying an adhesive on a predetermined position of the upper surface of a first round substrate, reversing the first round substrate applied with the adhesive, and bonding the reversed first round substrate and a second round substrate with each other via the adhesive on the first round substrate so as to obtain an optical recording disc.

According to the first aspect of the present invention, an optical recording disc is obtained by applying an adhesive on a predetermined position of the upper surface of a first round substrate, reversing the first round substrate applied with the adhesive, and bonding the reversed first round substrate and a second round substrate with each other via the adhesive on the first round substrate.

DESCRIPTION OF THE PREFERRED EMBODIMENTS

Figure 1A:
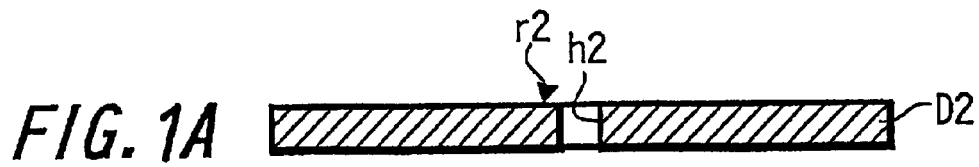
FIGS. 1A to 1E are step diagrams showing a production method for an optical recording disc of a conventional example.
Figure 1B:
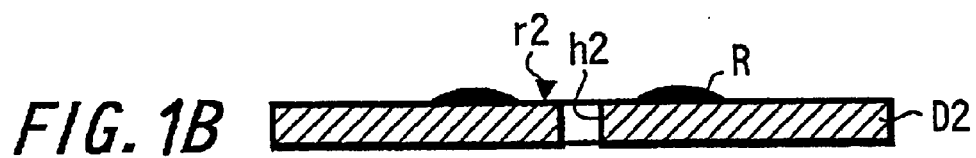
Figure 1C:
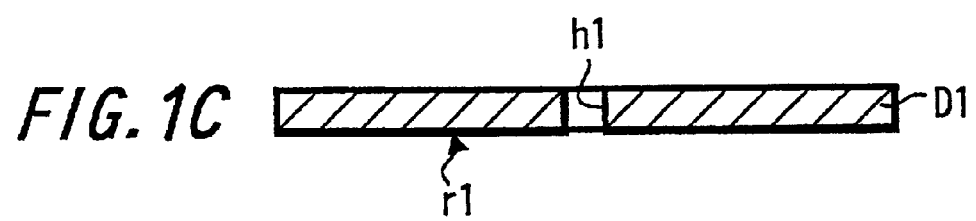
Figure 1D:
Figure 1E:
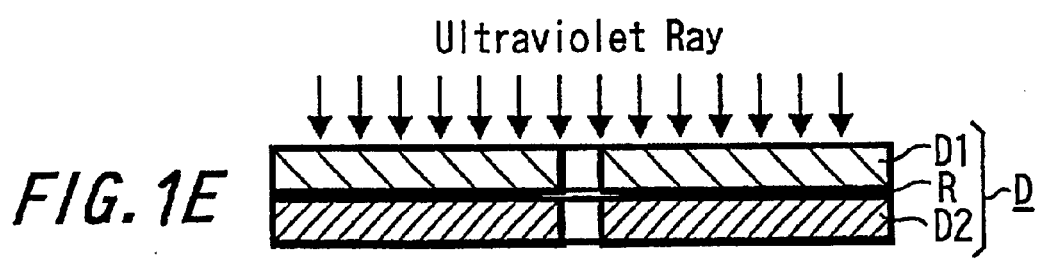

The first aspect of the present invention is a production method for an optical recording disc comprising the steps of applying an adhesive on a predetermined position of the upper surface of a first round substrate, reversing the first round substrate applied with the adhesive, and bonding the reversed first round substrate and a second round substrate with each other via the adhesive on the first round substrate so as to obtain an recording disc.

A second aspect of the present invention is a production method of an optical recording disc comprising the steps of applying an ultraviolet ray curing type resin on a predetermined position of the upper surface of a first round substrate, reversing the first round substrate applied with the ultraviolet ray curing type resin, obtaining an optical recording disc by uncured bonding of the reversed first round substrate and a second round substrate via the ultraviolet ray curing type resin on the first round substrate, and irradiating an ultraviolet ray to the optical recording disc obtained by the uncured bonding for curing the ultraviolet ray curing type resin so as to obtain an optical recording disc with the first and second round substrates bonded with each other.

A third aspect of the present invention is a production method for an optical recording disc comprising the steps of applying an ultraviolet ray curing type resin on a predetermined position of the upper surface of a first round substrate into a ring-like shape substantially concentrically with the first round substrate, reversing the first round substrate applied with the ultraviolet ray curing type resin, obtaining an optical recording disc by uncured bonding of the reversed first round substrate and a second round substrate via the ultraviolet ray curing type resin on the first round substrate, rotating the optical recording disc obtained by the uncured bonding at a high speed so as to spread the ultraviolet ray curing type resin between the first and second round substrates, irradiating an ultraviolet ray to the optical recording disc obtained by the uncured bonding for curing the spread ultraviolet ray curing type resin so as to obtain an optical recording disc with the first and second round substrates bonded with each other.

A fourth aspect of the present invention is a production apparatus for an optical recording disc comprising a first rotation table for transporting a first round substrate, an adhesive supplying means for supplying an adhesive to be applied on the first round substrate on the first rotation table, a substrate means for reversing the first round substrate on the first rotation table applied with the adhesive, a second rotation table for transporting a second round substrate, a holding and conveying means for holding and conveying the first round substrate on the first rotation table, applied with the adhesive, to the second rotation table side, a first substrate vertically driving means for elevating the first round substrate on the first rotation table, applied with the adhesive so as to be held by the holding and conveying means, and a second substrate vertically driving means for elevating the second round substrate on the second rotation table for uncured bonding with the first round substrate held by the holding and conveying means via the adhesive on the first round substrate.

A fifth aspect of the present invention is the production apparatus for an optical recording disc according to the fourth aspect of the present invention, wherein the adhesive is an ultraviolet ray curing type resin.

Hereinafter, with reference to drawings, concrete examples of embodiments of a production method of and a production apparatus for an optical recording disc of the present invention will be explained in detail.

Figure 2A:
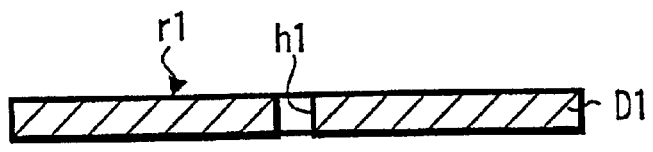
FIGS. 2A to 2F are step diagrams showing a production method for an optical recording disc according to a concrete example of an embodiment of the present invention.

First, with reference to FIGS. 2A to 2F, a concrete example of a production method of an optical recording disc will be explained. As shown in FIG. 2A, a first round substrate having a 120 mm in diameter (made from, for example, polycarbonate) D1 is prepared. h1 is the center hole of the first round substrate D1. r1 is the recording surface of the first round substrate D1, with a data recording trace (comprising pit rows with different lengths and widths) formed concentrically or along a track close to a circle.

Figure 2B:
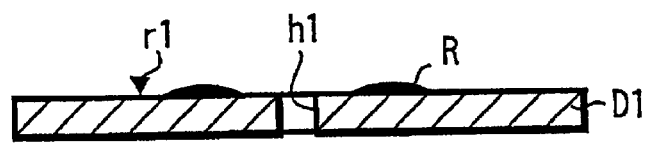

As shown in FIG. 2B, an ultraviolet ray curing type resin R as an adhesive is dropped onto the recording surface r1 while rotating the first round recording plate D1 at an appropriate position in the range of 15 mm to 50 mm in radius on the recording surface r1 of the first round recording plate D1 so as to apply the ultraviolet ray curing type resin R like a ring-like shape with a predetermined width substantially concentric with the first round recording plate D1.

Figure 2C:
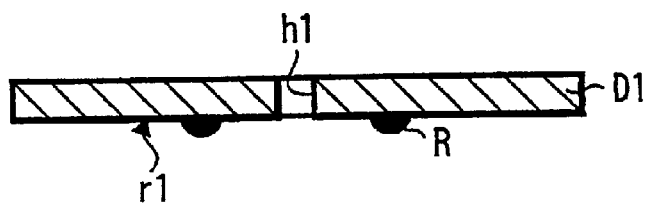

As shown in FIG. 2C, the first round recording plate D1 applied with the ultraviolet ray curing type resin R is reversed, that is, turned by 180 degrees. The ring-like ultraviolet ray curing type resin R on the recording surface r1 of the first round recording plate D1 is slightly sagged by its self weight.

Figure 2D:
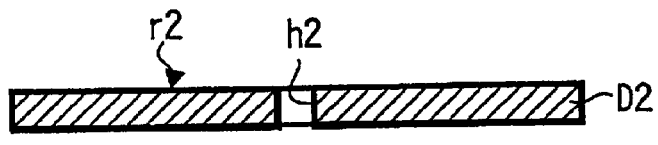

As shown in FIG. 2D, a second round substrate having a 120 mm diameter (made from, for example, polycarbonate) D2 is prepared. h2 is the center hole of the second round substrate D2. r2 is the recording surface of the second round substrate D2, with a data recording trace (comprising pit rows with different lengths and widths) formed concentrically or along a track tantamount to a circle.

Figure 2E:
Figure 2F:
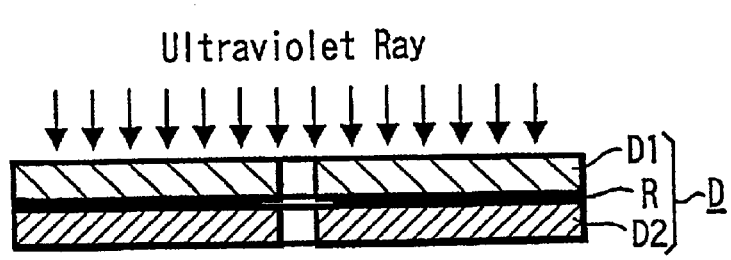

As shown in FIG. 2E, the recording surfaces r1, r2 of the first and second substrates D1, D2 are superimposed via the ultraviolet ray curing type resin R for uncured bonding so as to obtain an optical recording disc. In this case, since the ultraviolet ray curing type resin R on the lower surface of the first round substrate D1 is slightly sagged by its self weight as shown in FIG. 2C, the contact starting area of the ultraviolet ray curing type resin R with respect to the second round substrate D2 is narrower than the conventional example, and thus the number of bubbles contained in the ultraviolet ray curing type resin R is reduced drastically compared with the conventional example. As a result, the number of bubbles remaining in a cured ultraviolet ray curing type resin in a completed optical recording disc is reduced drastically compared with the conventional example so that a high quality optical disc can be obtained.

The optical recording disc obtained by the uncured bonding is rotated at a high speed so as to spread the ultraviolet ray curing type resin R between the first and second round substrates D1, D2 to the whole portion of the inner peripheral part and the outer peripheral part by the centrifugal force so as to have an even thickness for obtaining an optical recording disc D obtained by the uncured bonding.

As shown in FIG. 2E, by irradiating an ultraviolet ray to the optical recording disc D comprising the first and second round substrates D1, D2 obtained by the uncured bonding via the ultraviolet ray curing type resin R spread in FIG. 2D for curing the ultraviolet ray curing type resin R, the first and second round substrates D1, D2 are bonded so as to provide a completed optical recording disc D.

Figure 3:
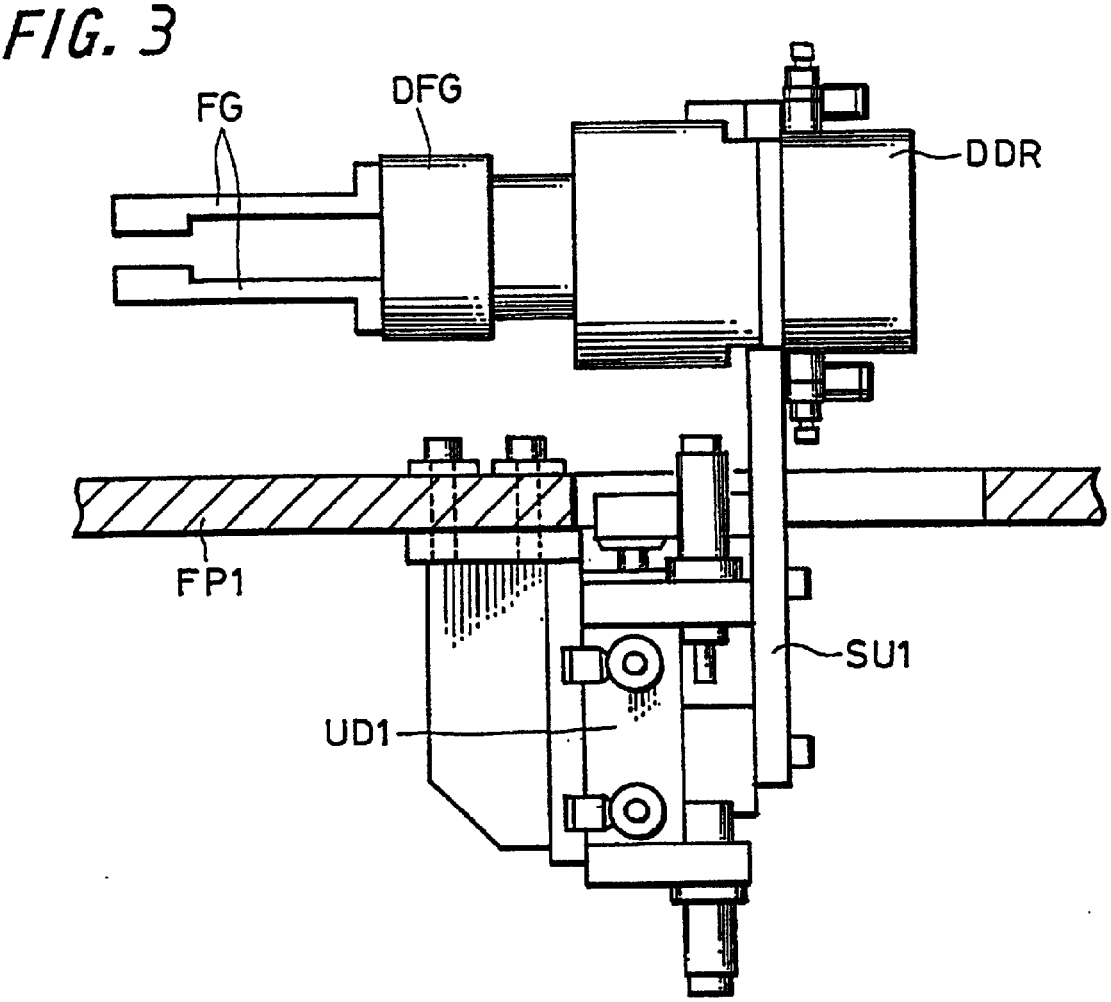
FIG. 3 is a side view including a partial cross-section showing a disc reversing device comprising a production apparatus for an optical recording disc according to a concrete example of an embodiment of the present invention.
Figure 4:
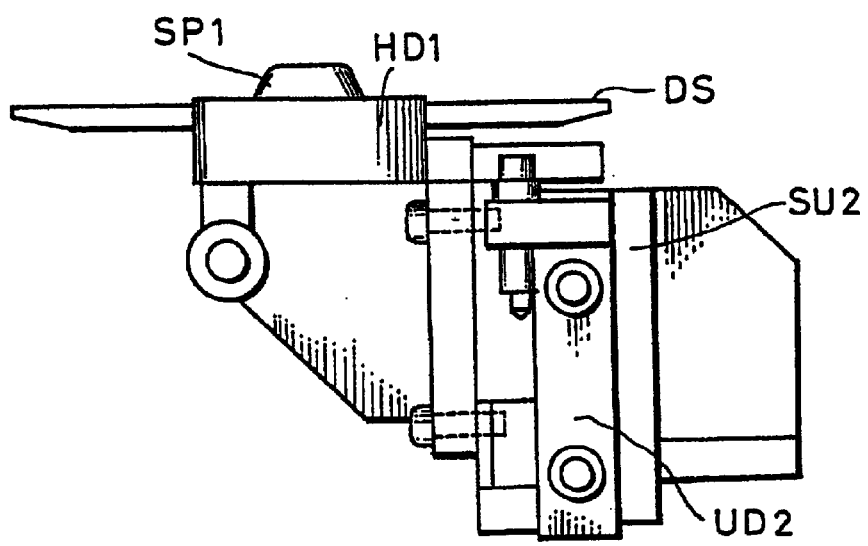
FIG. 4 is a side view showing a disc vertically driving device comprising a production apparatus for an optical recording disc according to a concrete example of an embodiment of the present invention.

Next, with reference to FIGS. 3 to 5, a concrete example of a production apparatus for an optical recording disc will be explained. First, the concrete example the production apparatus for an optical recording disc shown in FIG. 5 will be explained. BS denotes a base stand. Rotation tables RT1, RT2 of the same height adjacent with each other are mounted on the base stand BS each on the right and left sides. The rotation tables RT1, RT2 provided with six holes H1, H2 each at intervals of 60 degrees, rotates intermittently by 60 degrees. The diameter of each of the six holes H1, H2 is formed shorter than the diameter of the above-mentioned first and second round substrates D1, D2.

Figure 5:
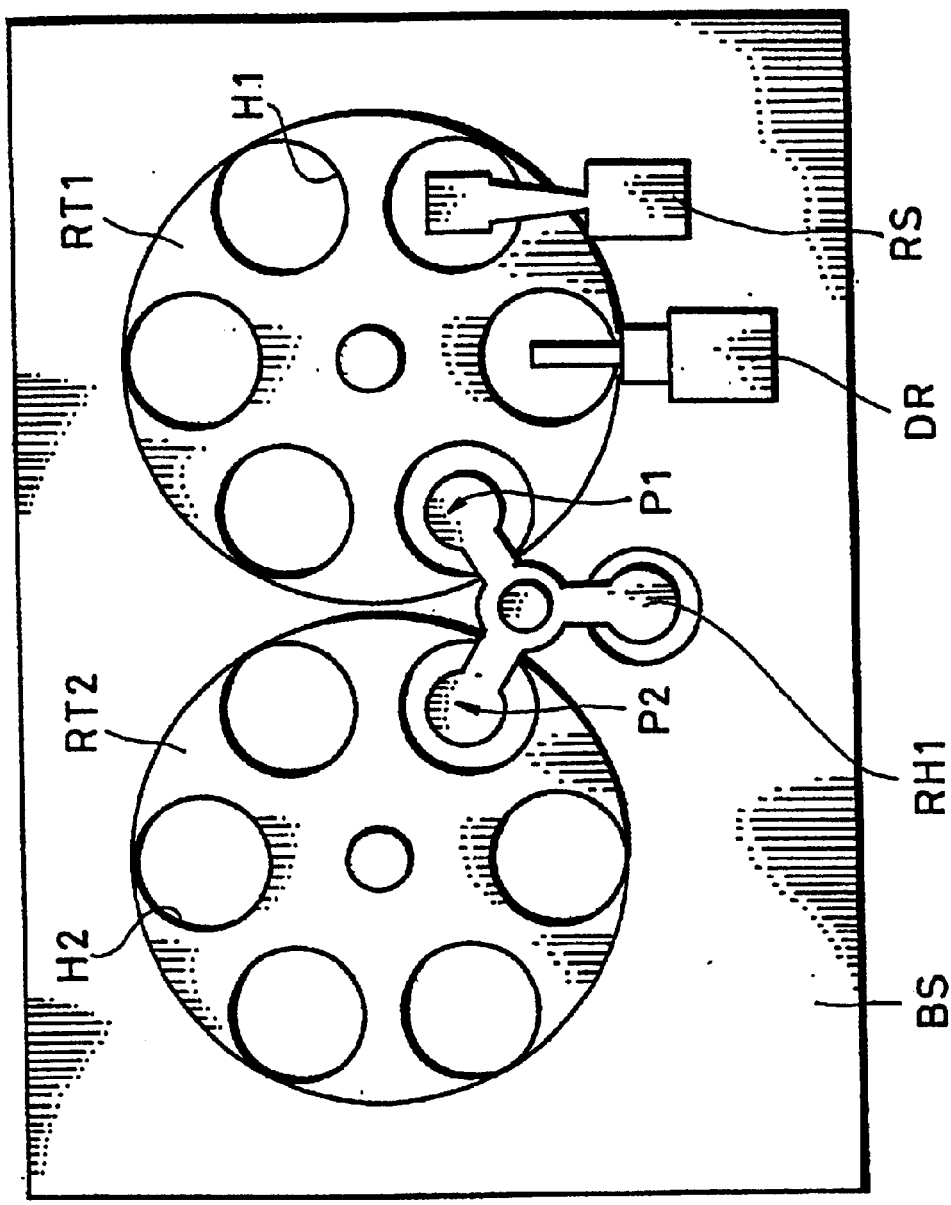
FIG. 5 is a plan view showing a production apparatus for a optical recording disc according to a concrete example of an embodiment of the present invention.

In FIG. 5, RS denotes a resin supply part, mounted on the base stand BS. The resin supply part RS has a nozzle (not illustrated) for dropping the ultraviolet ray curing type resin R onto the first round substrate D1 on the rotation table RT1. An unillustrated disc rotating means for slowly rotating the first round substrate is mounted on the base stand BS below the nozzle of the resin supply part RS as well as below the rotation table RT1. The disc rotating means drops the ultraviolet ray curing type resin R from the nozzle of the resin supply part RS onto the recording surface r1 of the first round substrate D1 like a ring through the hole H1 on the rotation table RT1 while rotating the first round substrate D1 (not illustrated in FIG. 5) on the hole H1. Thereafter, the rotation table RT1 is turned clockwise by 60 degrees.

DR denotes a disc reversing device for reversing the first round substrate D1 applied with the ultraviolet ray curing type resin R rotated and conveyed by the rotation table RT1, that is, for turning by 180 degrees.

Next, with reference to FIG. 3, the structure of an example of the disc reversing device DR will be explained. FP1 is a fixing plate. A disc vertically driving source UD1 comprising, for example, an air cylinder, is mounted on the fixing plate FP1. The disc vertically driving source UD1 is provided with a vertically movable slide unit SU1. A disc reversing driving source DDR comprising, for example, a rotary actuator, is mounted above the slide unit SU1. A finger driving source DFG comprising, for example, an air check, is mounted on the disc rotating driving source DDR. Two fingers FG parallel to each other are mounted on the finger driving source DFG. The two fingers FG are parallelly moved by the finger driving source DFG so as to vary the distance between the two fingers FG.

In the disc reversing device DR, in the case the disc reversing driving source DDR is in a lower position relative to the fixing plate FP1, the first round substrate D1 on the hole H1 of the rotation table RT1 held (clamped) at its center hole h1 the part of the center hole h1 with the opening/closure of the two fingers FG. Thereafter, the disc reversing driving source DDR is lifted by the disc vertically moving source UD1 via the slide unit SU1 to a degree not causing a trouble to the rotation of the first round substrate D1 by the finger driving source DFG. Thereafter, the two fingers FG holding the first round substrate D1 are turned by 180 degrees by the finger driving source DFG. Thereafter, the disc reversing driving source DDR is lowered by the disc vertically driving source UD1 via the slide unit SU1 so as to approach the fixing plate FP1 so that the reversed first round substrate D1 applied with the ultraviolet ray curing type resin R is returned onto the hole H1 of the rotation table RT1. Thereafter, the rotation table RT1 is turned clockwise by 60 degrees.

RH1 is a rotation arm holder for holding and conveying the first round substrate D1 from the rotation table RT1 To the rotation table RT2, and has, for example, three arms. A disc vertically driving device with the structure shown in FIG. 4 is mounted each at positions P1, P2 on the base stand BS below the rotation tables RT1, RT2.

Hereinafter, the structure of an example of the disc vertically driving device of FIG. 4 will be explained. UD2 denotes a disc vertically moving source comprising, for example, an air cylinder, mounted on the base stand BS. The disc vertically moving source UD2 is provided with a slide unit SU2. A holder HD1 and a spindle SP1 are mounted on the slide unit SU2. DS is a saucer for receiving the ultraviolet ray curing type resin R applied on the first round substrate D1 in case it is dropped. The saucer DS is necessary for the disc vertically driving device at the point P1 on the base stand BS but since it is not necessary for the disc vertically driving device at the point P2, the saucer DS is not provided.

The disc vertically driving device provided at the point P1 on the base stand BS lifts up the first round substrate D1 applied with the ultraviolet ray curing type resin on the lower surface on the hole H1 of the rotation table RT1 so that it is held by the rotation arm holder RH1. Thereafter, the rotation arm holder RH1 is turned counterclockwise by 120 degrees.

The disc vertically driving device provided at the point P2 on the base stand BS lifts up the second round substrate D2 on the hole H2 of the rotation table RT2 for uncured bonding with the first round substrate D1 held by the rotation arm holder RH1 via the ultraviolet ray curing type resin R applied on the first round substrate D1 so as to obtain an optical recording disc by the uncured bonding. The optical recording disc obtained by the uncured bonding is conveyed by the rotation table RT2 for executing subsequent treatments.

The optical recording disc obtained by the uncured bonding is rotated at a high speed by an unillustrated high speed rotation driving means for spreading the ultraviolet ray curing type resin R between the first and second round substrates D1, D2 to the whole portion of the inner peripheral part and the outer peripheral part by the centrifugal force so as to have an even thickness. The optical recording disc obtained by the uncured bonding is irradiated with an ultraviolet ray from an ultraviolet ray lamp for curing the spread ultraviolet ray curing type resin R so as to obtain a completed optical recording disc.

Although the case of an optical recording disc D with a data recording trace formed concentrically or along a track close to a circle on the recording surfaces r1, r2 of the first and second round substrates D1, D2 has been explained above, it can also be adopted to the case with an optically recordable layer formed.

According to the first aspect of the present invention, since an optical recording disc is obtained by the steps of applying an adhesive on a predetermined position of the upper surface of a first round substrate, reversing the first round substrate applied with the adhesive, and bonding the reversed first round substrate and a second round substrate with each other via the adhesive on the first round substrate, in a production method of an optical recording disc comprising two bonded round substrates, a production method of an optical recording disc capable of obtaining a high quality optical recording disc can be obtained by drastically reducing the number of bubbles remaining in the adhesive of the completed optical recording disc, and furthermore, the production yield of the optical recording disc and the yield of the optical recording disc itself can be improved.

According to the second aspect of the present invention, since an optical recording disc with the first and second round substrates bonded with each other is obtained by the steps of applying an ultraviolet ray curing type resin on a predetermined position of the upper surface of a first round substrate, reversing the first round substrate applied with the ultraviolet ray curing type resin, obtaining an optical recording disc by uncured bonding of the reversed first round substrate and a second round substrate via the ultraviolet ray curing type resin on the first round substrate, and irradiating an ultraviolet ray to the optical recording disc obtained by the uncured bonding for curing ultraviolet ray curing type resin, in a production method of an optical recording disc comprising two bonded round substrates, a production method of an optical recording disc capable of obtaining a high quality optical recording disc can be obtained by drastically reducing the number of bubbles remaining in the ultraviolet ray curing type resin of the completed optical recording disc, and furthermore, the production yield of the optical recording disc and the yield of the optical recording disc itself can further be improved.

According to the third aspect of the present invention, since an optical recording disc with the first and second round substrates bonded with each other is obtained by the steps of applying an ultraviolet ray curing type resin on a predetermined position of the upper surface of a first round substrate into a ring-like shape substantially concentric with the first round substrate, reversing the first round substrate applied with the ultraviolet ray curing type resin, obtaining an optical recording disc by uncured bonding of the reversed first round substrate and a second round substrate via the ultraviolet ray curing type resin on the first round substrate, rotating the optical recording disc obtained by the uncured bonding at a high speed so as to spread the ultraviolet ray curing type resin between the first and second round substrates, irradiating an ultraviolet ray to the optical recording disc obtained by the uncured bonding for curing the spread ultraviolet ray curing type resin, in a production method of an optical recording disc comprising two bonded round substrates, a production method of an optical recording disc capable of obtaining a further high quality optical recording disc can be obtained by drastically reducing the number of bubbles remaining in the ultraviolet ray curing type resin of the completed optical recording disc, and furthermore, the production yield of the optical recording disc and the yield of the optical recording disc itself can further be improved.

According to the fourth aspect of the present invention, since a first rotation table for transporting a first round substrate, an adhesive supplying means for supplying an adhesive to be applied on the first round substrate on the first rotation table, a substrate reversing means for reversing the first round substrate on the first rotation table, applied with the adhesive, a second rotation table for transporting a second round substrate, a holding and conveying means for holding and conveying the first round substrate on the first rotation table, applied with the adhesive, to the second rotation table side, a first substrate vertically driving means for elevating the first round substrate on the first rotation table, applied with the adhesive so as to be held by the holding and conveying means, and a second substrate vertically driving means for elevating the second round substrate on the second rotation table for uncured bonding with the first round substrate held by the holding and conveying means via the adhesive on the first round substrate are provided, in a production apparatus for an optical recording disc comprising two bonded round substrates, a production apparatus for an optical recording disc capable of obtaining a high quality optical recording disc can be obtained by drastically reducing the number of bubbles remaining in the adhesive of the completed optical recording disc, and furthermore, the production yield of the optical recording disc and the yield of the optical recording disc itself can be improved.

According to the fifth aspect of the present invention, since the adhesive is an ultraviolet ray curing type resin in the fourth aspect of the present invention, in the production apparatus for an optical recording disc comprising two bonded round substrates, a production apparatus for an optical recording disc capable of obtaining a high quality optical recording disc can be obtained by drastically reducing the number of bubbles remaining in the ultraviolet ray curing type resin of the completed optical recording disc, and furthermore, the production yield of the optical recording disc and the yield of the optical recording disc itself can further be improved.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A production apparatus for an optical recording disc comprising:

a first rotation table for transporting a first round substrate, an adhesive supplying means for supplying an adhesive to be applied on the first round substrate on the first rotation table, a substrate reversing means for reversing the first round substrate on the first rotation table, applied with the adhesive, a second rotation table for transporting a second round substrate, a holding and conveying means for holding and conveying the first round substrate on the first rotation table, applied with the adhesive, to the second rotation table side, a first substrate vertically driving means for elevating the first round substrate on the first rotation table, applied with the adhesive so as to be held by the holding and conveying means, and a second substrate vertically driving means for elevating the second round substrate on the second rotation table for uncured bonding with the first round substrate held by the holding and conveying means via the adhesive on the first round substrate.

2. The production apparatus for an optical recording disc according to claim 1, wherein the first substrate vertically driving means and the second substrate vertically driving means comprise:
a base stand,
a disc vertically driving source mounted on the base stand, provided with a slide unit,
a disc holder and a spindle mounted on the slide unit.

3. The production apparatus for an optical recording disc according to claim 1, wherein the substrate reversing means comprises a fixing plate,
a disc vertically driving source comprising an air cylinder mounted below the fixing plate,
a slide unit to be driven vertically by the disc driving source,
a disc reversing driving source comprising a rotary actuator mounted above the slide unit,
a finger driving source comprising an air check mounted on the disc reversing driving source, and
two fingers parallel with each other and with the distance variable, mounted on the finger driving source.

4. The production apparatus for an optical recording disc according to claim 1, wherein the adhesive is an ultraviolet ray curing type resin.

5. The production apparatus for an optical recording disc according to claim 1, wherein a data recording trace is formed on the bonding surfaces of the first and second round substrates.

6. The production apparatus for an optical recording disc according to claim 1, wherein an optically recordable layer is formed on the bonding surfaces of the first and second round substrates.

* * * * *